United States Patent
Eweiner et al.

(10) Patent No.: US 11,834,465 B2
(45) Date of Patent: *Dec. 5, 2023

(54) METHOD FOR PRODUCING TETRAKIS (TRIHYDROCARBYL PHOSPHANE) PALLADIUM(0)

(71) Applicant: Heraeus Deutschland Gmbh & Co. KG, Hanau (DE)

(72) Inventors: Florian Eweiner, Hanau (DE); Walter Lässig, Gelnhausen (DE); Richard Walter, Alzenau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,853

(22) Filed: Nov. 17, 2020

(65) Prior Publication Data

US 2021/0070793 A1     Mar. 11, 2021

Related U.S. Application Data

(63) Continuation of application No. 16/310,650, filed as application No. PCT/EP2016/069485 on Aug. 17, 2016, now Pat. No. 10,875,881, which is a continuation-in-part of application No. PCT/EP2016/065715, filed on Jul. 4, 2016.

(51) Int. Cl.
  *C07F 15/00* (2006.01)
  *C07F 9/50* (2006.01)

(52) U.S. Cl.
  CPC ........ *C07F 15/0066* (2013.01); *C07F 9/5045* (2013.01)

(58) Field of Classification Search
  CPC .................................. C07F 15/0066
  See application file for complete search history.

(56) References Cited

U.S. PATENT DOCUMENTS

| | | | |
|---|---|---|---|
| 4,863,510 A | | 9/1989 | Tamemasa et al. |
| 6,124,421 A | * | 9/2000 | Lau ................... H01L 23/49894 528/480 |
| 10,875,881 B2 | * | 12/2020 | Eweiner ............. C07F 15/0066 |

FOREIGN PATENT DOCUMENTS

WO     WO-2010128316 A1    11/2010

OTHER PUBLICATIONS

Jain et al. RSC Adv. 2015, 5, 31311.*
Roberts, C. et al. Lanmuir, 2009, 25(12), 7116-7128.*
D. Coulson et al., Inorganic Syntheses, vol. XIII, 121-124 (1972) (Year: 1972).*
A. Boricha et al., 87 Hydrometallurgy, 140-147 (2007) (Year: 2007).*
Bäckvall, et al., Stereo- and regioselective palladium-catalyzed 1,4-acetoxychlorination of 1,3-dienes, synthons in organic transformation, Journal of the American Chemical Society, 1985, 107:12:1:3676-3686.
McLaughlin, et al., Fluoride-Catalyzed Reduction of Palladium(II) to Palladium(0)-Phosphine Complexes, Organometallics, 1998, 17:26:5937-5940.
International Search Report issued in PCT/EP2016/069485 dated Oct. 5, 2015.
Wange, Zhi-Li et al., Scientific Reports, 2012, 1-6.

* cited by examiner

*Primary Examiner* — Alexander R Pagano
(74) *Attorney, Agent, or Firm* — Blank Rome LLP

(57) ABSTRACT

Method for the production of tetrakis(trihydrocarbylphosphane)palladium(0) in organic solvent, whereby 50 to 100% by weight of the organic solvent consist of at least one polar-aprotic solvent, characterised in that a) at least one palladium compound selected from the group consisting of palladium(II) compounds and palladium(IV) compounds that are soluble in the organic solvent is reacted with b) at least one base, selected from the group consisting of alkali metal hydroxides, alkali metal carbonates, alkali metal hydrogen carbonates, alkali metal-$C_1$-$C_4$-alcoholates, ammonium carbonate, ammonium hydrogen carbonate, alkaline earth metal hydroxides, alkaline earth metal carbonates, alkaline earth metal hydrogen carbonates, alkaline earth metal-$C_1$-$C_4$-alcoholates, and alkylamines with a total of 2 to 12 carbon atoms; c) at least one trihydrocarbylphosphane; and d) at least one organic reducing agent that is different from the remaining components that are used in the method.

20 Claims, No Drawings

METHOD FOR PRODUCING TETRAKIS (TRIHYDROCARBYL PHOSPHANE) PALLADIUM(0)

This application is a continuation of U.S. Non-Provisional application Ser. No. 16/310,650 filed Dec. 17, 2018, which is a national stage of International Patent Application No. PCT/EP2016/069485 filed Aug. 17, 2016, which claims the benefit of International Patent Application No. PCT/EP2016/065715 filed Jul. 4, 2016, each of which are hereby incorporated by reference in their entirety.

Transition metal-catalysed cross coupling reactions for linking, mainly, unsaturated C-atoms have become indispensable in modern organic chemistry. Examples to be mentioned here include the Suzuki coupling for the production of agents, such as the antibiotic vancomycin, or the Stille coupling for the production of conjugated polymers. Pd(0) complexes are by far the most frequently used transition metal catalysts for this purpose. Palladium(0)-triarylphosphane complexes, such as tetrakis(triphenylphosphane)palladium(0), are an important class of Pd(0) complexes.

The synthesis of tetrakis(triphenylphosphane)palladium (0) is known from Coulson, Tetrakis(triphenylphosphine) palladium(0), Inorganic Synthesis; 1972, pages 121-123. Here, starting from $PdCl_2$ and $PPh_3$ in DMSO solution and hydrazine hydrate, the tetrakis(triphenylphosphane)palladium complex with Pd in oxidation state (0) is obtained. Since hydrazine hydrate and other hydrazine derivatives are toxic and can be carcinogenic, there are continuing efforts to replace hydrazine hydrate and derivatives as reactants in order to improve the occupational safety.

WO 2010/128316 describes a hydrazine hydrate-free production procedure, in which a Pd(II) compound is reacted in at least one solvent containing a base and a ligand L ($PPh_3$). The yields typically range from 66 to 93%.

It was the object of the present invention to develop a method for the production of tetrakis(trihydrocarbylphosphane)palladium(0), which provides for the highest possible yield and forgoes the use of hydrazine hydrate.

To this end, a method is provided, in which Pd(II) and/or Pd(IV) compounds in organic solvent are reacted with at least one trihydrocarbylphosphane ligand through the aid of at least one base and at least one organic reducing agent.

Specifically, the object is met by a method for the production of tetrakis(trihydrocarbylphosphane)palladium(0) in organic solvent, whereby 50 to 100% by weight of the organic solvent consist of at least one polar-aprotic solvent, characterised in that
  a) at least one palladium compound selected from the group consisting of palladium(II) compounds and palladium(IV) compounds that are soluble in the organic solvent is reacted with
  b) at least one base, selected from the group consisting of alkali metal hydroxides, alkali metal carbonates, alkali metal hydrogen carbonates, alkali metal-$C_1$-$C_4$-alcoholates, ammonium carbonate, ammonium hydrogen carbonate, alkaline earth metal hydroxides, alkaline earth metal carbonates, alkaline earth metal hydrogen carbonates, alkaline earth metal-$C_1$-$C_4$-alcoholates, and alkylamines with a total of 2 to 12 carbon atoms;
  c) at least one trihydrocarbylphosphane; and
  d) at least one organic reducing agent that is different from the remaining components that are used in the method.

The terms "alkali metal" and "alkaline earth metal" that are used in the context of component b) and, further on, in the context of component d), stand for lithium, sodium, and potassium or magnesium, calcium, and barium, respectively.

Through the use of the present method, tetrakis(trihydrocarbylphosphane)palladium(0) can be produced without the use of hydrazine hydrate at yields in excess of 95%, relative to the palladium in the at least one palladium compound that is used in the method.

The at least one, preferably only one, palladium compound can be selected from palladium compounds in oxidation states (II) and (IV) that are soluble in the organic solvent. Preferably, the at least one palladium compound is a compound selected from the group consisting of alkali tetrahalogenopalladates(II), ammonium tetrahalogenopalladates(II), alkali hexahalogenopalladates(IV), ammonium hexahalogenopalladates(IV), palladium(II) halides, palladium(II) nitrate, palladium(II) sulfate, bis(trihydrocarbylphosphane)palladium(II) dihalides, $Pd(COD)Cl_2$ (COD=cyclooctadiene), $Pd(CH_3CN)_2Cl_2$, $Pd(C_6H_5CN)_2Cl_2$, and palladium(II) acetate.

The halides can be chlorine, bromine or iodine, in particular chlorine or bromine. In a preferred embodiment, the palladium compound is $PdCl_2$.

Used in the context of the alkali tetrahalogenopalladates (II) and the alkali hexahalogenopalladates(IV) of component a), the term "alkali" stands for sodium or potassium.

According to the invention, the organic solvent comprises at least one, preferably only one, polar-aprotic organic solvent in an amount of 50 to 100% by weight, in particular in an amount of 90 to 100% by weight, specifically 100% by weight. In the context of the present invention, a solvent shall be understood to be "polar" if it has an ET(30) value of 150 kJ/mol or more. The polar-aprotic solvent preferably has an ET(30) value of 170 kJ/mol or more (referring to ET(30) values, see C. Reichardt, Chem. Rev. 1994, 94, 2319-2358). Preferred polar-aprotic solvents are selected from the group consisting of tertiary carboxylic acid amides (e.g. DMF), sulfoxides (e.g. DMSO), ketones (e.g. acetone), lactones (e.g. gamma-butyrolactone), lactams (e.g. N-methyl-2-pyrrolidone), nitriles (e.g. acetonitrile), urea derivatives, sulfones, carboxylic acid esters (e.g. acetic acid ethyl ester), and carbonic acid esters. DMF, DMSO, acetone, gamma-butyrolactone, N-methyl-2-pyrrolidone, acetic acid ethyl ester, and acetonitrile are particularly preferred.

Aside from the at least one polar-aprotic organic solvent, one or more additional organic solvents that are miscible with the at least one polar-aprotic solvent can be used as well. Said additional organic solvents can be selected from the group of the polar-protic solvents (e.g. alcohols) and the apolar solvents (such as, e.g., pentane, hexane, heptane, benzene, toluene, xylene). Alcohols such as, e.g., methanol, ethanol, 1-propanol, 2-propanol, 1-butanol, 2-butanol, tert-butanol, and benzylalcohol are preferred polar-protic solvents. The additional organic solvent(s) account(s) for 0 to 50% by weight, in particular 0 to 10% by weight, specifically 0% by weight of the total organic solvent according to the above-mentioned specifications for the at least one polar-aprotic solvent.

The at least one, preferably only one, base can be selected from the group consisting of alkali metal hydroxides, alkali metal carbonates, alkali metal hydrogen carbonates, alkali metal-$C_1$-$C_4$-alcoholates, ammonium carbonate, ammonium hydrogen carbonate, alkaline earth metal hydroxides, alkaline earth metal carbonates, alkaline earth metal hydrogen carbonates, alkaline earth metal-$C_1$-$C_4$-alcoholates, and alkylamines with a total of 2 to 12 carbon atoms. Hydroxides, in particular alkali metal hydroxides, such as, e.g., sodium hydroxide, hydrogen carbonates, in particular alkali metal hydrogen carbonates, such as, e.g., sodium hydrogen carbonate, alkali metal carbonates, such as, e.g., sodium carbonate, and trialkylamines, such as, e.g., triethylamine, are preferred.

Alkali metal hydroxides, such as, e.g., sodium hydroxide, hydrogen carbonates, in particular alkali metal hydrogen carbonates, such as, e.g., sodium hydrogen carbonate, alkali metal carbonates, such as, e.g., sodium carbonate, and triethylamine, specifically the inorganic bases, i.e. the alkali metal hydroxides, such as, e.g., sodium hydroxide, the hydrogen carbonates, in particular the alkali metal hydrogen carbonates, such as, e.g., sodium hydrogen carbonate, the alkali metal carbonates, such as, e.g., sodium carbonate, are particularly preferred.

In one embodiment, the at least one, preferably only one, organic reducing agent is selected from the group consisting of ascorbic acid, formic acid, as well as alkali metal, alkaline earth metal and ammonium salts of said acids, phenols with a reducing effect, such as, e.g., hydroquinone, catechol, resorcinol, pyrogallol, hydroxyhydroquinone, phenol derivatives with a reducing effect and sugars with a reducing effect, such as, e.g., mono-, di- or oligosaccharides. Particularly preferred sugars with a reducing effect are mannose, glucose, fructose, maltose, lactose, and galactose. Ascorbic acid and formic acid, in particular ascorbic acid, are preferred as organic reducing agents. The at least one organic reducing agent differs from the remaining components that are used in the method according to the invention (including organic solvents as well as components a) to c)).

The three hydrocarbyl residues of the at least one, preferably only one, trihydrocarbylphosphane can be selected from the group consisting of unsubstituted and substituted aryl residues, open chain alkyl residues, and cyclic alkyl residues, in any combination thereof. Preferably, the trihydrocarbylphosphane comprises three identical hydrocarbyl residues. Substituted aryl residues of the trihydrocarbylphosphanes can each be mono-, di- or tri-substituted. Alkyl substituents with 1-10 carbon atoms are preferred.

In one embodiment, this concerns trialkylphosphanes with three alkyl residues each of which comprises 1-10 carbon atoms. The alkyl residues of the trialkylphosphanes can be identical or different from each other. Methyl, ethyl, n-propyl, isopropyl, n-butyl, tert-butyl, cyclohexyl and adamantyl residues, in particular ethyl, n-propyl, isopropyl, n-butyl, tert-butyl and cyclohexyl residues are preferred alkyl residues of said trialkylphosphanes.

One preferred embodiment concerns triarylphosphanes, in particular unsubstituted triphenylphosphane.

Besides, the trihydrocarbylphosphanes can just as well be selected from the group consisting of:
phenyl-di-tert-butylphosphane, di-tert-butyl-neopentylphosphane, tricyclohexylphosphane, di(tert-butyl)phosphane, tris(para-tolyl)phosphane, tris(ortho-tolyl)phosphane, tris(2,4,6,-trimethylphenyl)phosphane, tris(2,6-dimethylphenyl) phosphane, 1-adamantyl-di-tert-butylphosphane, benzyl-di-1-adamantylphosphane, n-butyl-di-1-adamantylphosphane, cyclohexyl-di-(tert-butyl)phosphane, cyclohexyl-diphenylphosphane.

A preferred embodiment of the present invention is a method for the production of tetrakis(trihydrocarbylphosphane)palladium(0) in organic solvent that consists of 50 to 100% by weight, preferably 100% by weight, of at least one polar-aprotic solvent selected from the group consisting of DMF, DMSO, acetone, gamma-butyrolactone, N-methyl-2-pyrrolidone, acetic acid ethyl ester, and acetonitrile, in particular of 50 to 100% by weight, preferably 100% by weight, DMSO, characterised in that A) at least one palladium compound selected from the group consisting of alkali tetrahalogenopalladates(II), ammonium tetrahalogenopalladates(II), alkali hexahalogenopalladates(IV), ammonium hexahalogenopalladates(IV), palladium(II) halides, palladium(II) nitrate, palladium(II) sulfate, bis(trihydrocarbylphosphane)palladium(II) dihalides, $Pd(COD)Cl_2$ (COD=cyclooctadiene), $Pd(CH_3CN)_2Cl_2$, $Pd(C_6H_5CN)_2Cl_2$, and palladium(II) acetate, in particular $PdCl_2$, is reacted with b) at least one base, selected from the group consisting of alkali metal hydroxides, alkali metal carbonates, alkali metal hydrogen carbonates, and triethylamine, but selected particularly from the group consisting of alkali metal hydroxides, alkali metal carbonates, and alkali metal hydrogen carbonates;

c) at least one trihydrocarbylphosphane, in particular triphenylphosphane; and d) at least one reducing agent selected from the group consisting of formic acid, ascorbic acid as well as alkali metal, alkaline earth metal, and ammonium salts of said acids, but, in particular, ascorbic acid.

In order to attain particularly high yields, it is preferred to implement the method according to the invention in an inert gas atmosphere. The inert gas can comprise, e.g., nitrogen or argon.

The at least one reducing agent is used, relative to palladium, for example, in an amount equal to 1- to 3-fold of the equivalent amount required for reduction to palladium (0).

For example, 2-4 molar equivalents of base are used per molar equivalent of palladium(II), or, for example, 4-8 molar equivalents of base are used per molar equivalent of palladium(IV).

It is preferred to use the at least one trihydrocarbylphosphane in an amount equal to 4- to 6-fold of the molar equivalent, relative to palladium.

The concentration of the palladium used this context, relative to the organic solvent, can be in the range of, for example, 0.05 mol/L to 0.25 mol/L, preferably in the range of 0.10 mol/L to 0.15 mol/L.

Preferably, the method of the present invention is a one-pot reaction. Usually, the organic solvent will be added first and the reactants are added into the solvent.

The reaction temperature can be in the range of 45 to 80° C., in particular in the range of 55 to 70° C.

The purification can take place according to methods that are familiar to a person skilled in the art, for example without a need for extensive cleaning procedures. Accordingly, the tetrakis(trihydrocarbylphosphane)palladium(0) thus produced can be separated as a solid from the liquid phase, e.g. by filtration, centrifugation or decanting. The separated solid can be washed with water. After this may follow further washing steps with water-miscible alcohols (e.g. isopropanol) and then with alkanes (i.e. petroleum ether). Subsequently, the product can be dried at reduced pressure.

The method according to the invention can be used to produce tetrakis(trihydrocarbylphosphane)palladium(0) complexes at high yield without the use of hydrazine hydrate. In particular, yields of 95% or more relative to the palladium in the at least one palladium compound used in the method are readily attainable by the method of the present invention.

EXAMPLES

Example 1

Approx. 215 g DMSO, 5.032 g $PdCl_2$ (Pd 3.000 g, 28.19 mmol), 37.5 g $PPh_3$ ($PPh_3$ 143.13 mmol) and 9.9 g formic acid ($C_6H_8O_6$ 56.25 mmol) and 6.6 g $NaHCO_3$ (78.56 mmol) were placed in a 4-necked flask, and approx. 10 g DMSO were used for rinsing. Subsequently, the mixture was stirred at room temperature for 20 minutes. Then, the suspension was heated to an internal temperature of 60° C. Once the temperature was reached, the mixture had a bright yellow colour.

After stirring for a period of 2 hours at 60° C., the sample was cooled passively to room temperature (22° C.).

The suspension was transferred through a Teflon hose by means of argon into a Schlenk frit (G3 frit) made inert with argon, and then filtered. The content of the flask was rinsed with 15 g of DMSO and then also transferred to the frit. This resulted in a bright red filtrate and a bright yellow filter cake.

The product on the Schlenk frit was washed with 4×80 g fully de-salted water, 3×30 g isopropanol, and 3×20 g petroleum spirit. The filter cake was dried for approximately 40 minutes at reduced pressure.

This resulted in a bright yellow powder.

The product was then tested for its palladium content. Moreover, an IR spectrum was measured and an elemental analysis was performed.

Product=32.003 g
Pd content=9.15% by weight (gravimetric determination in triplicate, theoretical value 9.20 wt.-%)
Pd=2.92 g (added: 3.00 g)
Yield=97.6% relative to the palladium in the $PdCl_2$ used here
IR: corresponds to the reference spectrum for pure $Pd(PPh_3)_4$
Elemental analysis: expected for $Pd(PPh_3)_4$ C, 74.84%; H, 5.23%; O, 0%; P, 10.72%; detected C, 74.30%; H, 5.35%; O<0.2%; P, 10.55%.

Examples 2-4

Three other experiments were run analogous to Example 1. The only difference being the type of base that was used, while all other substances and molar amounts of substances were kept unchanged:

| Example | 1 | 2 | 3 | 4 |
|---|---|---|---|---|
| Base | $NaHCO_3$ | KOH | $Na_2CO_3$ | $NEt_3$ |
| Palladium compound | | $PdCl_2$ | | |
| Reducing agent | | Ascorbic acid | | |
| Trihydrocarbylphosphane | | Triphenylphosphane | | |
| Solvent | | DMSO | | |
| Yield (by $^{31}$P-NMR spectroscopy) | 100% | 98% | 100% | 100% |

The invention claimed is:

1. A method for the production of tetrakis(trihydrocarbylphosphane)palladium(0) in organic solvent, whereby 50 to 100% by weight of the organic solvent consists of at least one polar-aprotic solvent, the method comprising reacting
at least one palladium compound selected from the group consisting of palladium(II) compounds and palladium (IV) compounds solubilized in the organic solvent with at least one base selected from the group consisting of alkali metal hydroxides, alkali metal carbonates, alkali metal hydrogen carbonates, alkali metal-$C_1$-$C_4$-alcoholates, ammonium carbonate, ammonium hydrogen carbonate, alkaline earth metal hydroxides, alkaline earth metal carbonates, alkaline earth metal hydrogen carbonates, alkaline earth metal-$C_1$-$C_4$-alcoholates, and alkylamines with a total of 2 to 12 carbon atoms,
at least one trihydrocarbylphosphane, and
at least one organic reducing agent selected from the group consisting of ascorbic acid, alkali metal salts of ascorbic acid, alkaline earth metal salts of ascorbic acid, and ammonium salt of ascorbic acid,
wherein the method exhibits a tetrakis(trihydrocarbylphosphane)palladium(0) product yield ranging from 95% to 100%.

2. The method of claim 1, wherein the at least one palladium compound is selected from the group consisting of alkali tetrahalogenopalladates(II), ammonium tetrahalogenopalladates(II), alkali hexahalogenopalladates(IV), ammonium hexahalogenopalladates(IV), palladium(II) halides, palladium(II) nitrate, palladium(II) sulfate, bis(trihydrocarbylphosphane)palladium(II) dihalides, Pd(COD)$Cl_2$, Pd($CH_3CN)_2Cl_2$, Pd($C_6H_5CN)_2Cl_2$, and palladium(II) acetate.

3. The method of claim 1, wherein the at least one palladium compound is $PdCl_2$.

4. The method of claim 1, wherein the at least one polar-aprotic solvent is selected from the group consisting of tertiary carboxylic acid amides, sulfoxides, ketones, lactones, lactams, nitriles, urea derivatives, sulfones, carboxylic acid esters, and carbonic acid esters.

5. The method of claim 1, wherein the at least one polar-aprotic solvent is selected from the group consisting of DMF, DMSO, acetone, gamma-butyrolactone, N-methyl-2-pyrrolidone, acetic acid ethyl ester, and acetonitrile.

6. The method of claim 1, wherein the at least one organic reducing agent is ascorbic acid.

7. The method of claim 1, wherein the three hydrocarbyl residues of the at least one trihydrocarbylphosphane are selected from the group consisting of unsubstituted aryl residues, substituted aryl residues, open chain alkyl residues, and cyclic alkyl residues, in any combination thereof.

8. The method of claim 1, wherein the at least one trihydrocarbylphosphane is triphenylphosphane.

9. The method of claim 1, wherein
the at least one polar-aprotic solvent is selected from the group consisting of DMF, DMSO, acetone, gamma-butyrolactone, N-methyl-2-pyrrolidone, acetic acid ethyl ester, and acetonitrile,
the at least one palladium compound is selected from the group consisting of alkali tetrahalogenopalladates(II), ammonium tetrahalogenopalladates(II), alkali hexahalogenopalladates(IV), ammonium hexahalogenopalladates(IV), palladium(II) halides, palladium(II) nitrate, palladium(II) sulfate, bis(trihydrocarbylphosphane)palladium(II) dihalides, Pd(COD)$Cl_2$ (COD=cyclooctadiene), Pd($CH_3CN)_2Cl_2$, Pd($C_6H_5CN)_2Cl_2$, and palladium(II) acetate, and
the at least one base is selected from the group consisting of alkali metal hydroxides, alkali metal carbonates, alkali metal hydrogen carbonates, and triethylamine.

10. The method of claim 1, wherein the at least one palladium compound is $PdCl_2$ and the at least one organic reducing agent is ascorbic acid.

11. The method of claim 9, wherein the at least one trihydrocarbylphosphane is triphenylphosphane.

12. The method of claim 1, wherein the at least one reducing agent is used, relative to palladium, in an amount equal to 1- to 3-fold of the equivalent amount required for reduction to palladium(0).

13. The method of claim 1, wherein 2-4 molar equivalents of base are used per molar equivalent of palladium(II) and 4 - 8 molar equivalents of base are used per molar equivalent of palladium(IV).

14. The method of claim 1, wherein the at least one trihydrocarbylphosphane is used in an amount equal to 4- to 6-fold of the molar equivalent, relative to palladium.

15. The method of claim 1, wherein the concentration of the palladium used in the method, relative to the organic solvent, is in the range of 0.05 mol/L to 0.25 mol/L.

16. The method of claim 1, wherein the tetrakis(trihydrocarbylphosphane)palladium(0) thus produced is separated as a solid from the liquid phase, and the separated solid is washed with water followed by further washing steps with water-miscible alcohols, and then the product is dried at reduced pressure.

17. The method of claim 16, wherein the solid tetrakis(trihydrocarbylphosphane)palladium(0) is separated from the liquid phase by filtration, centrifugation or decanting.

18. The method of claim 1, wherein the tetrakis(trihydrocarbylphosphane)palladium(0) thus produced is separated as a solid from the liquid phase, and the separated solid is washed with water followed by further washing steps with water-miscible alcohols and then with alkanes, and then the product is dried at reduced pressure.

19. The method of claim 18, wherein the solid tetrakis(trihydrocarbylphosphane)palladium(0) is separated from the liquid phase by filtration, centrifugation or decanting.

20. A method for the production of tetrakis(triphenylphosphane)palladium(0) in organic solvent, whereby 50 to 100% by weight of the organic solvent consists of at least one polar-aprotic solvent, the method comprising reacting $PdCl_2$ solubilized in the organic solvent with a base selected from the group consisting of $NaHCO_3$, KOH, $Na_2CO_3$ and triethylamine, triphenylphosphane, and ascorbic acid or a salt thereof, wherein the method exhibits a tetrakis(triphenylphosphane)palladium(0) product yield ranging from 97.6% to 100%.

* * * * *